US007635454B2

(12) United States Patent
Mastromatteo et al.

(10) Patent No.: US 7,635,454 B2
(45) Date of Patent: Dec. 22, 2009

(54) INTEGRATED CHEMICAL MICROREACTOR WITH SEPARATED CHANNELS

(75) Inventors: Ubaldo Mastromatteo, Bareggio (IT); Flavio Francesco Villa, Milan (IT); Gabriele Barlocchi, Cornaredo (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 967 days.

(21) Appl. No.: 10/997,235

(22) Filed: Nov. 24, 2004

(65) Prior Publication Data

US 2005/0142597 A1 Jun. 30, 2005

(30) Foreign Application Priority Data

Nov. 28, 2003 (EP) .................................. 03425771

(51) Int. Cl.
*B01J 19/00* (2006.01)

(52) U.S. Cl. ...................................................... 422/130

(58) Field of Classification Search .................. 422/130
See application file for complete search history.

(56) References Cited

U.S. PATENT DOCUMENTS

| | | | | |
|---|---|---|---|---|
| 4,993,143 | A | 2/1991 | Sidner et al. | |
| 5,429,734 | A | 7/1995 | Gajar et al. | |
| 5,637,469 | A | 6/1997 | Wilding et al. | |
| 5,639,423 | A | 6/1997 | Northrup et al. | |
| 5,922,591 | A | 7/1999 | Anderson et al. | |
| 5,939,312 | A | 8/1999 | Baier et al. | |
| 5,942,443 | A | 8/1999 | Parce et al. | |
| 6,046,056 | A | 4/2000 | Parce et al. | |
| 6,168,948 | B1 | 1/2001 | Anderson et al. | |
| 6,261,431 | B1 | 7/2001 | Mathies et al. | |
| 6,267,858 | B1 | 7/2001 | Parce et al. | |
| 6,376,291 | B1 | 4/2002 | Barlocchi et al. | |
| 6,403,367 | B1 | 6/2002 | Cheng et al. | |
| 6,527,890 | B1 * | 3/2003 | Briscoe et al. | 156/89.11 |
| 6,710,311 | B2 | 3/2004 | Villa et al. | |
| 6,770,471 | B2 | 8/2004 | Barlocchi et al. | |

(Continued)

FOREIGN PATENT DOCUMENTS

EP 1161985 A1 * 12/2001

(Continued)

OTHER PUBLICATIONS

Barlocchi, U.S. Appl. No. 10/996,593 filed Nov. 24, 2004.

(Continued)

*Primary Examiner*—Walter D Griffin
*Assistant Examiner*—Bobby Ramdhanie
(74) *Attorney, Agent, or Firm*—Baker & McKenzie LLP

(57) ABSTRACT

The microreactor is formed by a sandwich including a first body, an intermediate sealing layer and a second body. A buried channel extends in the first body and communicates with the surface of the first body through a first and a second apertures. A first and a second reservoirs are formed in the second body and are at least partially aligned with the first and second apertures. The sealing layer separates the first aperture from the first reservoir and the second aperture from the second reservoir, thereby avoiding contamination of liquids contained in the buried channel from the outside and from any adjacent buried channels. The sealing layer is perforated during use of the device, but a resilient plug can be used to reseal the device.

27 Claims, 5 Drawing Sheets

U.S. PATENT DOCUMENTS

| | | | | |
|---|---|---|---|---|
| 2001/0036672 | A1 | 11/2001 | Anderson et al. | |
| 2001/0049200 | A1 * | 12/2001 | Erratico et al. | 438/701 |
| 2002/0017660 | A1 | 2/2002 | Villa et al. | |
| 2002/0022261 | A1 | 2/2002 | Anderson et al. | |
| 2002/0045244 | A1 | 4/2002 | Barlocchi et al. | |
| 2002/0055167 | A1 | 5/2002 | Pourahmadi et al. | |
| 2002/0060156 | A1 | 5/2002 | Mathies et al. | |
| 2002/0068334 | A1 | 6/2002 | Carrino et al. | |
| 2002/0068357 | A1 | 6/2002 | Mathies et al. | |
| 2002/0097900 | A1 | 7/2002 | Arena et al. | |
| 2003/0057199 | A1 | 3/2003 | Villa et al. | |
| 2004/0132059 | A1 | 7/2004 | Scurati et al. | |

FOREIGN PATENT DOCUMENTS

| | | | |
|---|---|---|---|
| EP | 1304388 A | | 4/2003 |
| IT | TO2002A000808 | | 11/2003 |
| WO | WO-02/00347 A | | 1/2002 |
| WO | WO 0200347 A2 | * | 1/2002 |

OTHER PUBLICATIONS

Zhang, N., Automated and Integrated System for Thigh-Throughput DNA Genotyping Directly from Blood, Analytical Chemistry, Mar. 15, 1999, pp. 1138-1145, vol. 71(6).

Search report, EP 03 425 771 filed May 26, 2004.

* cited by examiner

INTEGRATED CHEMICAL MICROREACTOR WITH SEPARATED CHANNELS

PRIOR RELATED APPLICATIONS

This application claims priority to application EP03425771.7 filed on Nov. 28, 2003.

FIELD OF THE INVENTION

The present invention refers to an integrated chemical microreactor with separated channels for confining liquids inside the channels and to the manufacturing process for making same. The chemical microreactors are advantageously used for biological tests.

BACKGROUND OF THE INVENTION

Typical procedures for analyzing biological materials, such as nucleic acid, involve a variety of operations starting from raw material. These operations may include various degrees of cell purification, lysis, amplification or purification, and analysis of the resulting amplified or purified product.

As an example, in DNA-based blood tests the samples are often purified by filtration, centrifugation or by electrophoresis so as to eliminate all the non-nucleated cells. Then, the remaining white blood cells are lysed using chemical, thermal or biochemical means in order to liberate the DNA to be analyzed.

Next, the DNA is denatured by thermal, biochemical or chemical processes and amplified by an amplification reaction, such as PCR (polymerase chain reaction), LCR (ligase chain reaction), SDA (strand displacement amplification), TMA (transcription-mediated amplification), RCA (rolling circle amplification), and the like. The amplification step allows the operator to avoid purification of the DNA being studied because the amplified product greatly exceeds the starting DNA in the sample.

The procedures are similar if RNA is to be analyzed, but more emphasis is placed on purification or other means to protect the labile RNA molecule. RNA is usually copied into DNA (cDNA) and then the analysis proceeds as described for DNA.

Finally, the amplification product undergoes some type of analysis, usually based on sequence or size or some combination thereof. In an analysis by hybridization, for example, the amplified DNA is passed over a plurality of detectors made up of individual oligonucleotide probe fragments that are anchored, for example, on electrodes. If the amplified DNA strands are complementary to the probes, stable bonds will be formed between them and the hybridized probes can be read by observation by a wide variety of means, including optical, electrical, mechanical, magnetic or thermal means.

Other biological molecules are analyzed in a similar way, but typically molecule purification is substituted for amplification and detection methods vary according to the molecule being detected. For example, a common diagnostic involves the detection of a specific protein by binding to its antibody or by a specific enzymatic reaction. Lipids, carbohydrates, drugs and small molecules from biological fluids are processed in similar ways.

The discussion herein has been simplified by focusing on nucleic acid analysis, in particular DNA amplification, as an example of a biological molecule that can be analyzed using the devices of the invention. However, as described above, the invention can be used for any chemical or biological test.

The steps of nucleic acid analysis described above are currently performed using different devices, each of which presides over one part of the process. The use of separate devices decreases efficiency and increases cost, in part because of the required sample transfer between the devices. Another contributor to inefficiencies are the large sample sizes, required to accommodate sample loss between devices and instrument limitations. Most importantly, expensive, qualified operators are required to perform the analysis. For these reasons a fully integrated micro-device would be preferred.

Integrated microreactors of semiconductor material are already known. For example, publication EP1161985 (corresponding to U.S. Pat. No. 6,710,311 et seq) describes a microreactor and the respective manufacturing process suitable for making an integrated DNA-amplification microreactor.

According to this process, a substrate of monocrystalline silicon is etched in TMAH to form a plurality of thin channels; then an epitaxial layer is grown on top of the substrate and of the channels. The epitaxial layer closes at the top the buried channels and forms, together with the substrate, a semiconductor body.

The surface of the semiconductor body is then covered with an insulating layer; heating and sensing elements are formed on the insulating layer; inlet and outlet apertures are formed through the insulating layer and the semiconductor body and connect the surface of the structure so obtained with the buried channels. Then, a covering structure accommodating an inlet and an outlet reservoir is formed or bonded on the structure accommodating the buried channels.

The above solution has proven satisfactory, but does not allow separation of the samples because the channels are connected in parallel through the common input and outlet reservoirs. However, in some applications there is need for separating the channels from each other and from the outside environment, both for preventing evaporation and for preventing cross-contamination between channels.

Therefore, the aim of the present invention is to provide a microreactor and a manufacturing process overcoming the drawbacks of the known solution.

SUMMARY OF THE INVENTION

According to the present invention, there are provided a chemical microreactor and its manufacturing process, as defined, respectively, in claim 1 and claim 11.

For a better understanding of the present invention, two preferred embodiments thereof are now described, simply as non-limiting examples, with reference to the attached drawings.

DETAILED DESCRIPTION OF THE INVENTION

Figure 1:
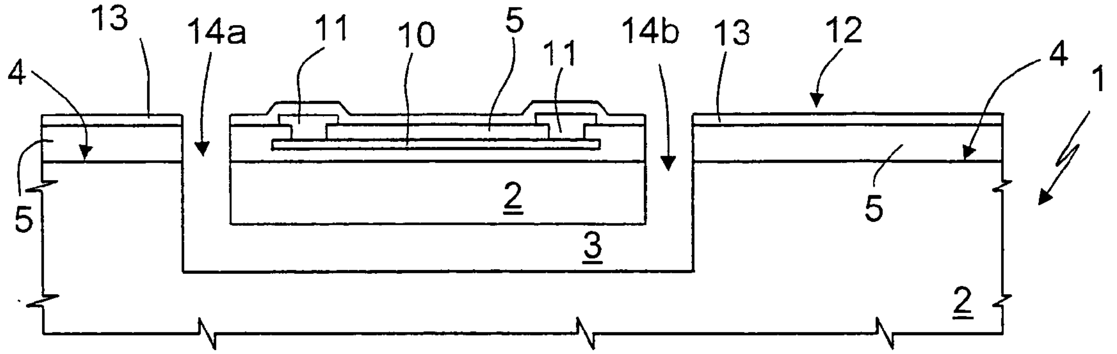
FIGS. 1 and 2 show respectively a cross-section and a top view of a first wafer incorporating a part of a microreactor during a manufacturing step.
Figure 2:
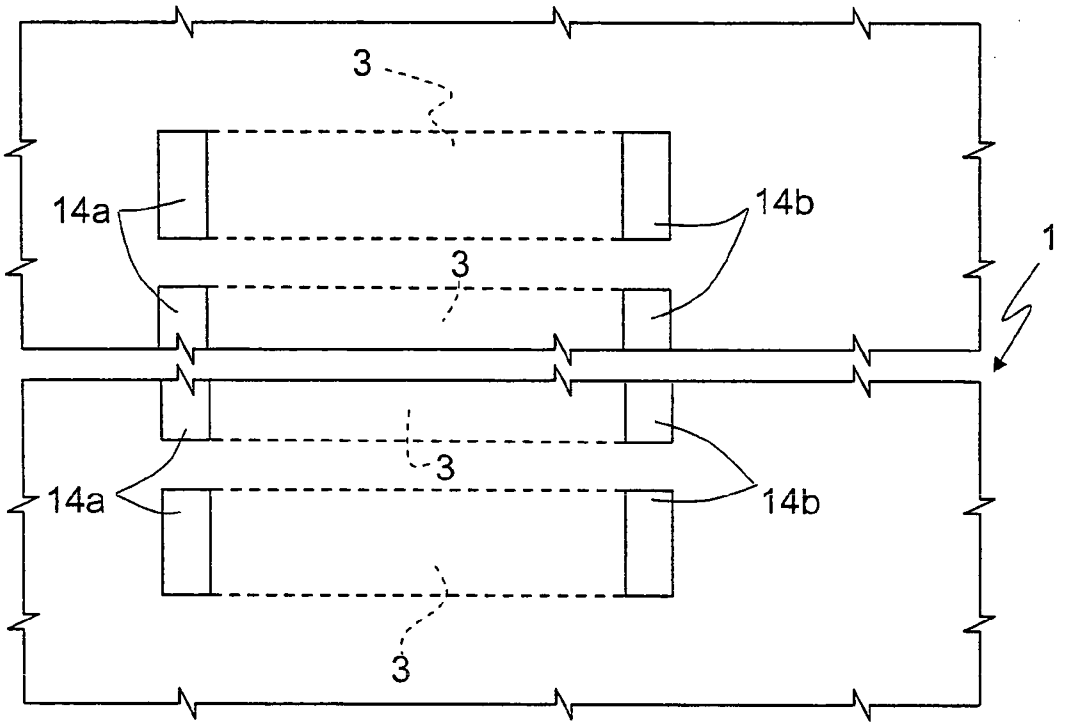

Hereinbelow, a first embodiment of the invention will be described with reference to FIGS. 1 to 7. The various layers and regions are not in scale, for better representation.

Initially, process steps are carried out similar to those above described for the known process. Accordingly, FIG. 1, a first wafer 1 of monocrystalline silicon is etched in TMAH to form a plurality of channels 3. To this end, a grid-like mask is used, e.g. as disclosed in EP1193214 (corresponding to US2002045244 and U.S. Pat. No. 6,770,471) or as disclosed in copending patent application “Integrated chemical microreactor with large area channels and manufacturing process thereof” filed on the same date.

Then, a structural layer is grown on top of the channels. The structural layer closes the top the channels 3 and forms a substrate 2 of semiconductor material with buried channels. The surface 4 of the substrate 2 is then covered with a first oxide layer; heating elements 10 of polycrystalline silicon are formed thereon; a second oxide layer is deposited and forms, with the first oxide layer, a first insulating layer 5; contact regions 11 (and related metal lines) are formed in contact with the heating elements 10; a second insulating layer 13 is deposited, for example of TEOS, defining an upper surface 12 of the first wafer 1.

Then, inlet apertures 14*a* and outlet apertures 14*b* are etched. The apertures 14*a* and 14*b* extend from the upper surface 12 through the second insulating layer 13, the first insulating layer 5 and the substrate 2 as far as the channels 3 and are substantially aligned with the longitudinal ends thereof. This is visible in FIG. 2, wherein channels 3 are drawn with dashed lines. In the shown example, one inlet aperture 14*a* and one outlet aperture 14*b* is formed for each channel 3. In the alternative, two or more channels 3 may share the same inlet and outlet apertures 14*a*, 14*b*, if parallel processing in a part of channels 3 is desired.

Figure 3:
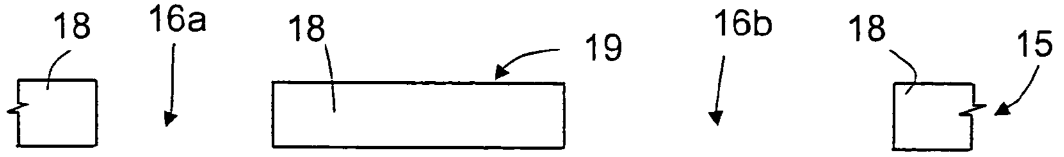
FIGS. 3 and 4 are a cross-section and a top view of a second wafer of the microreactor according to a first embodiment of the present microreactor.
Figure 4:
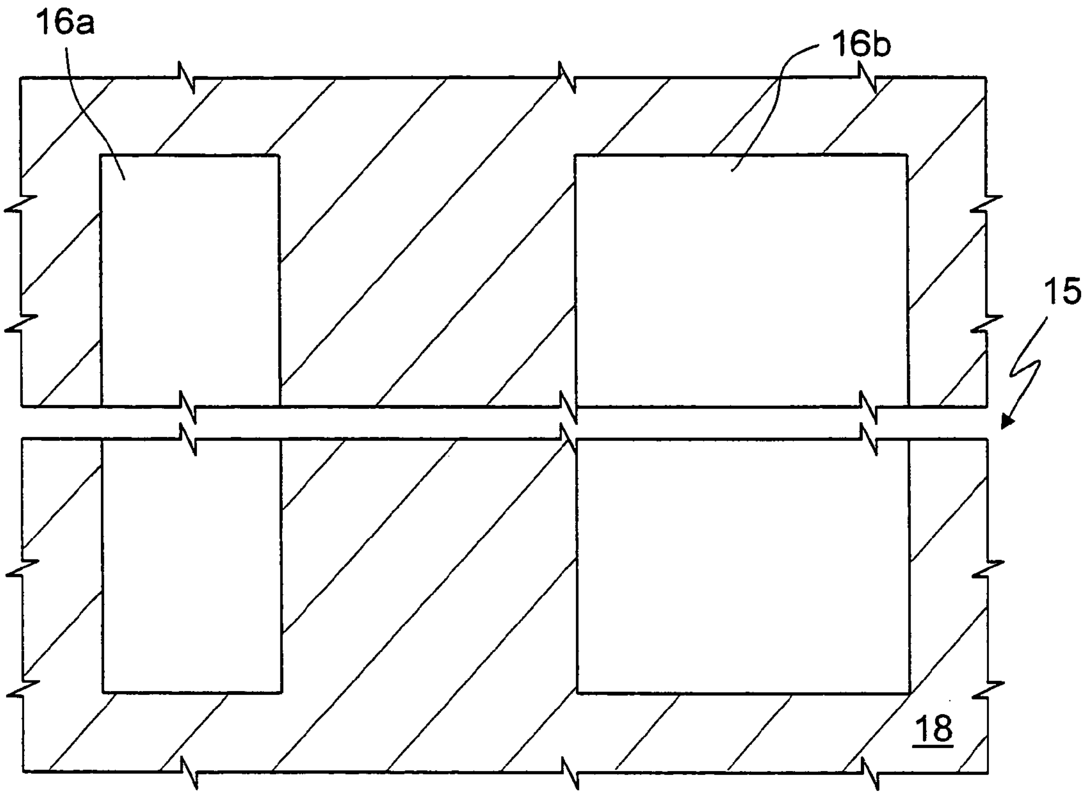

In the meantime, beforehand or subsequently, a second wafer 15 of glass is treated to form reservoirs (FIGS. 3 and 4). In detail, the second wafer 15, formed by a glass sheet 18 having a surface 19, is subjected to a lithographic process, in a per se known manner, to define an inlet opening 16*a* and an outlet opening 16*b* intended to be aligned with the inlet and outlet apertures 14*a*, 14*b* and to form inlet/outlet reservoirs.

Figure 5:
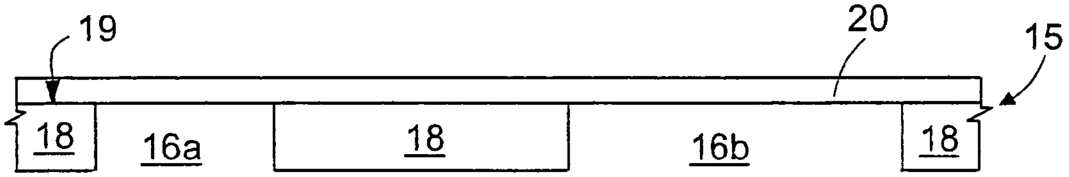
FIG. 5 is a cross-section of the second wafer during a subsequent manufacturing step.

Then, FIG. 5, a bonding layer 20 is applied on surface 19 of the glass sheet 18. For example, the bonding layer 20 is made of dry resist, with a thickness of 10-30 μm, and may be the product known by the commercial name “Riston® YieldMaster®” by Du Pont, that can be laminated in thin layers, or the resist sold by the firm Tokyo Ohka Kogyo Co., Ltd.

Figure 6:
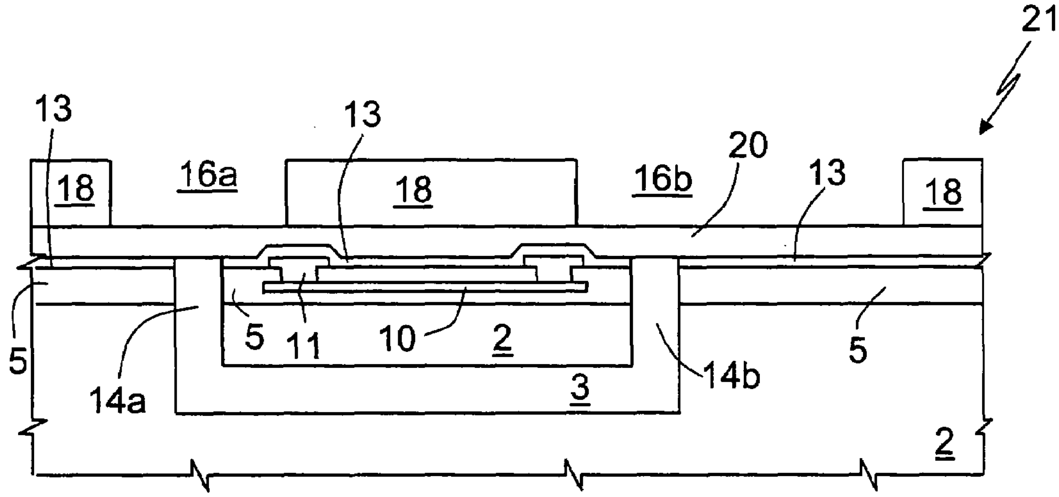
FIG. 6 is a cross-section through a composite wafer obtained by bonding the first and second wafers in a final manufacturing step.

Subsequently, FIG. 6, the second wafer 15 is turned upside down and put on the first wafer 1, with the bonding layer 20 in contact with the surface 12 of the first layer; then the sandwich including the first wafer 1, the bonding layer 20 and the second wafer 15 is treated to cause bonding of the bonding layer 20 to the first wafer 1, thereby obtaining multiple wafer 21.

For example, bonding may be carried out at a temperature of 140-180° C., preferably 160° C.; at a force of 5-9 kN, preferably 7 kN (for wafers having a diameter of 6") and in a vacuum or low pressure condition of $5\times10^{-7}$ to $5\times10^{-6}$ bar, preferably $10^{-6}$ bar.

In this way, the channels 3 are not connected to the inlet and outlet openings 16*a*, 16*b* forming inlet and outlet reservoirs, but are separated therefrom and from the outside environment by the bonding layer 20 that now acts as a sealing layer; thereby the channels are kept at the low pressure condition that existed during bonding.

Figure 7:
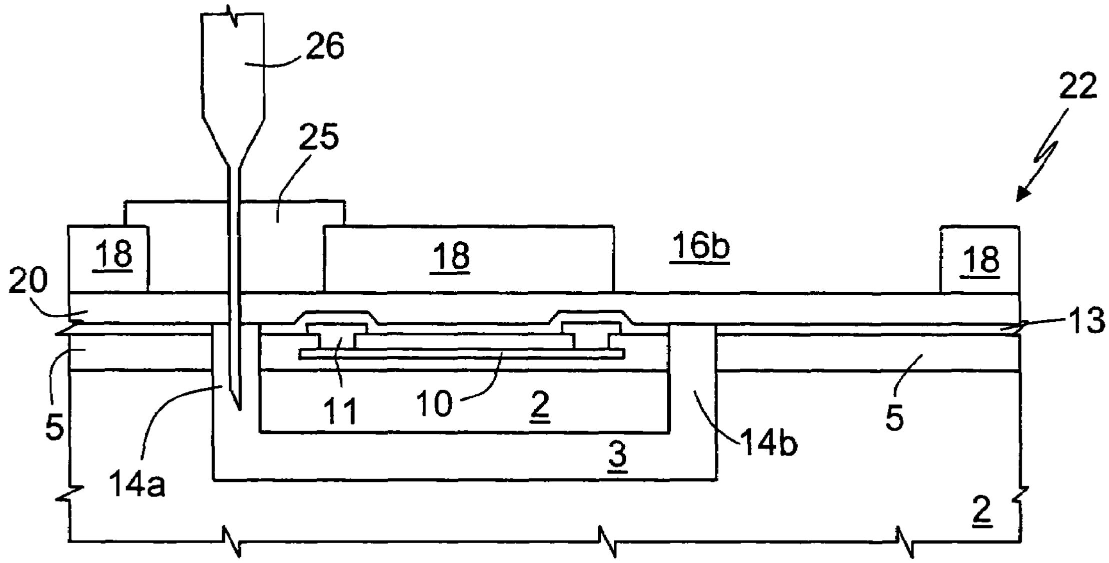
FIG. 7 is a cross-section of the microreactor in use.

After dicing the multiple wafer 21 into single microreactors 22, FIG. 7, the inlet opening 16*a* is closed by a plug 25. The plug 25 is e.g. formed by applying a drop of liquid thermosetting material that is subsequently hardened by heat.

In the alternative, the plug 25 may be applied only when the microreactor 22 is used, and may comprise a preformed plug 25 already connected to a syringe 26 of the retractable type. Preferably, the plug 25 is of a resilient material that is able to be punctured by the syringe 26 and to close the puncture passage after removal of the syringe, without forming shavings. For example, the plug 25 may be made of PVC including a softener, of the type used for biomedical applications.

In use, when liquid is to be inserted in a specific channel 3, a syringe 26 is inserted through the plug 25, perforates the bonding layer 20 and injects the mixture or mixtures to be treated in the selected channel (or channels) 3. Injection of the liquid to be treated is favored by the presence of low pressure (vacuum).

The syringe 26 is then removed and the plug 25 closes to as to ensure a complete isolation of the channel(s) 3 containing the injected liquid with respect to the environment during thermal cycling or other provided treatment.

At the completion of the treatment, the liquid is extracted by perforating the bonding layer 20 at the outlet reservoir 16*b*; for example, another syringe may be used to aspirate the liquid, or a plunger may break the bonding layer 20 at the outlet reservoir 16*b* and a pressure be exerted from the inlet reservoir 16*a*.

Figure 8:
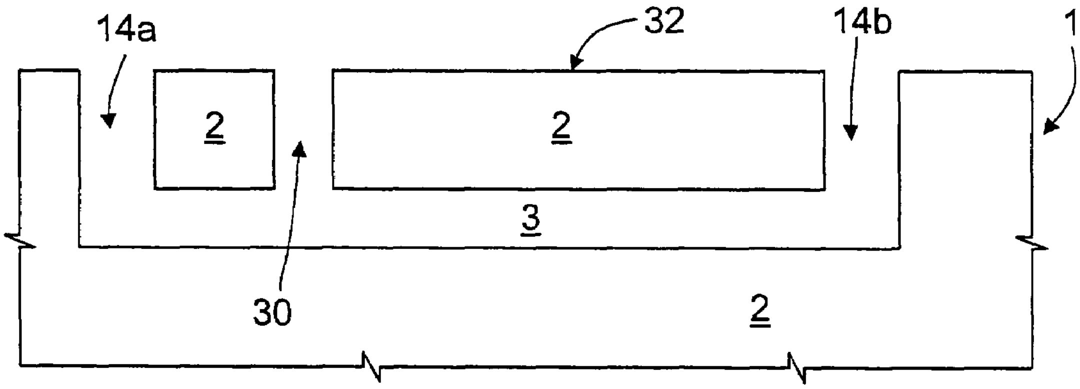
FIGS. 8 and 9 are cross-sections of a first wafer incorporating a part of a microreactor according to a second embodiment.
Figure 9:
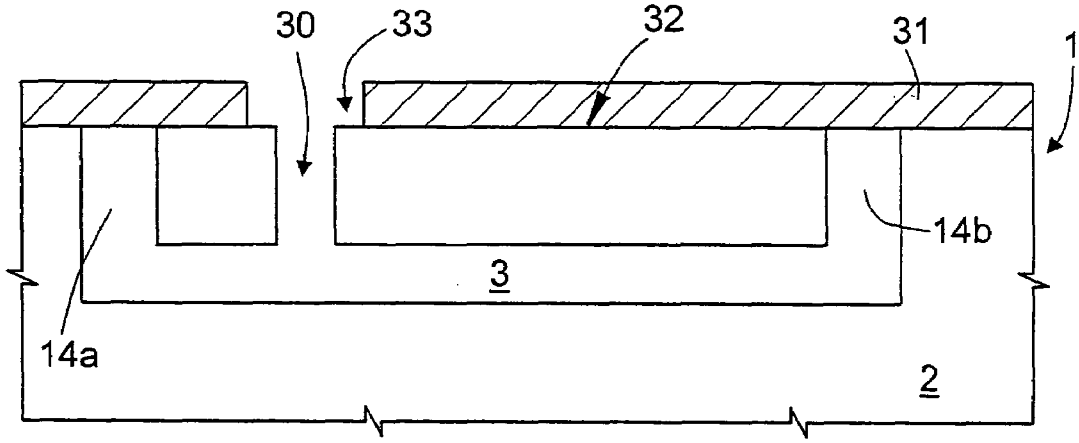
Figure 10:
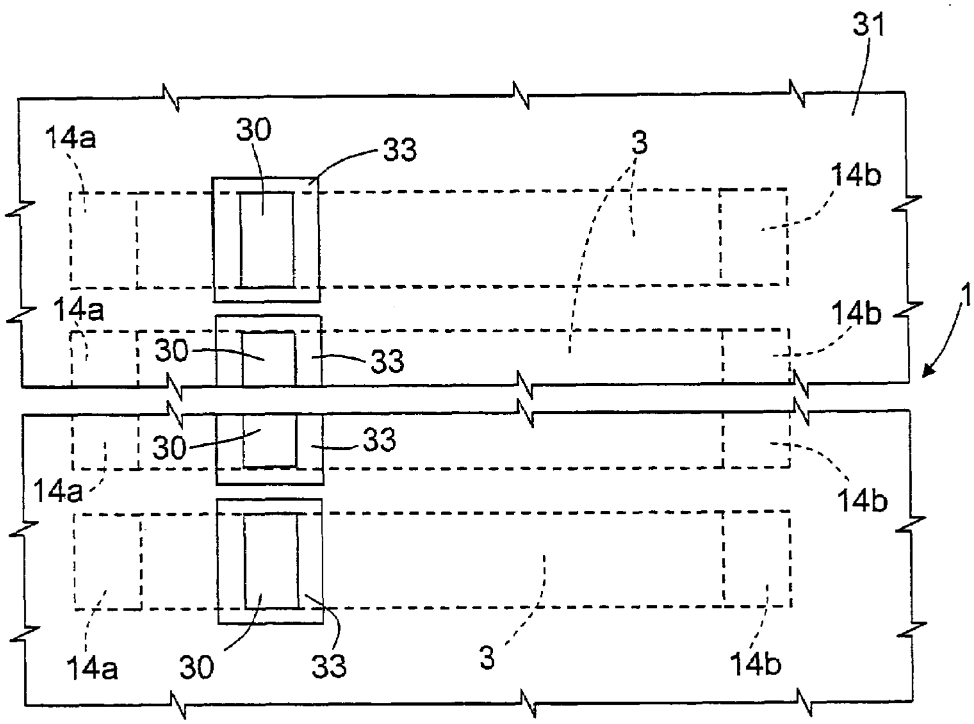
FIGS. 10 and 11 are respectively a top view and a cross-section through a composite wafer obtained by bonding the first with a second wafer in a final manufacturing step according to a second embodiment.

According to a different embodiment, the bonding/sealing layer is applied to the semiconductor wafer and an auxiliary hole is provided to create the vacuum inside the channels during bonding, as shown in FIGS. 8-10, wherein the first wafer has been represented in a very schematic way.

In detail, FIG. 8, a first wafer 1 is subjected to the same manufacturing steps described above with reference to FIG. 1. Thus, the first wafer 1 is etched to form channels 3; a structural layer is grown to form a substrate 2 of semiconductor material; insulating layers 5, 13, and heating elements 10 and contacts 11 (none shown, please refer to FIG. 1) are formed.

Then the inlet and outlet apertures 14*a*, 14*b* are etched. According to the second embodiment, simultaneously with the inlet and outlet apertures 14*a*, 14*b*, at least one hole 30 is formed for each channel 3, intermediate to the inlet and outlet apertures 14*a*, 14*b*. In case of more channels 3 connected to same inlet/outlet apertures 14*a*, 14*b*, a single hole 30 may be sufficient.

Then, FIG. 9, a bonding layer 31 is formed on a surface 32 of wafer 1. Preferably, the bonding layer 31 is dry resist which is laminated onto the surface 32. For example, the bonding layer 31 may be of the same material as bonding layer 20 of FIGS. 5-7 and have the same thickness (10-30 μm).

Thereafter, the bonding layer 31 is lithographically defined to form connection openings 33 over the holes 30 (see also FIG. 10). Preferably, one connection opening 33 is formed for each hole 30, as shown in the drawings; in case of parallel connected channels 3, a connection opening 33 is in common to more holes 30 and/or more channels 3.

Thereby, the inlet/outlet apertures 14*a*, 14*b* are upwardly closed by the bonding layer 31, but the channels 3 are connected to the outside environment by the holes 30 and the connection openings 33.

Figure 11:
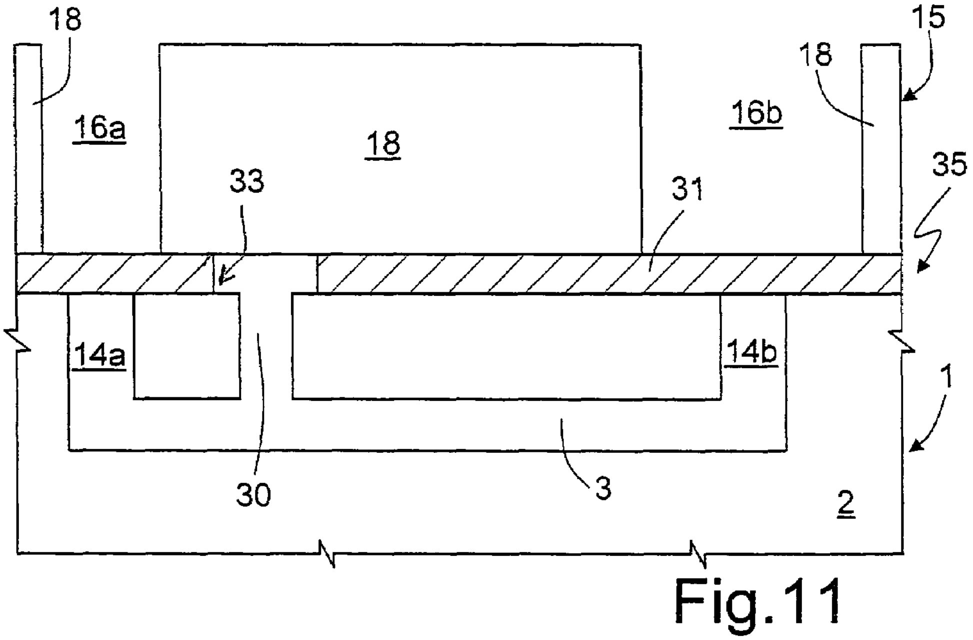

Then, FIG. 11, the first wafer 1 is bonded to a second wafer 15 formed by a glass sheet 18 wherein, previously, an inlet opening 16*a* and an outlet opening 16*b* have been formed, analogously to what has been described with reference to FIGS. 3 and 4. Also here, the input and output openings 16*a*, 16*b* are designed so as to be aligned to the inlet and outlet apertures 14*a*, 14*b*.

Bonding may be carried out as before described, that is at a temperature of 140-180° C., preferably 160° C.; at a force of 5-9 kN, preferably 7 kN and in a vacuum or low pressure condition of $5\times10^{-7}$ to $5\times10^{-6}$ bar, preferably $10^{-6}$ bar. Thus, during bonding, the channels 3 are maintained at low pressure by virtue of the holes 30 and the connection openings 33.

Thereby, a multiple wafer 35 is obtained, wherein the input and output openings 16*a*, 16*b* are closed upwardly by the bonding layer 31 and the holes 30 are upwardly closed by the glass sheet 18. However, the channels are buried inside the monolithic structure of the first wafer. As used herein "buried channel" is defined as a channel or chamber that is buried inside of a single monolithic support, as opposed to a channel or chamber that is made by welding or otherwise bonding two supports with a channel or two half channels together. Of course, other components may be welded or otherwise attached to the monolithic support, as required for the complete integrated device.

Therefore, also here, the channels 3 are sealed from the outside environment by the bonding layer 31 and are kept at the low pressure condition existing during bonding.

In use, analogously to the above, the mixture or mixtures is inserted in the selected channel (or channels) 3 in a very simple way, by virtue of the vacuum condition in the channel(s) 3 by simply perforating the bonding layer 31 with a syringe at the input opening 16*a*. Furthermore, a plug 25 may be provided to seal the channel(s) 3 after perforation.

By virtue of the described reactor and process, the finished microreactor 22 has channels 3 sealed from the outside, and allows separation of the material accommodated in the channels from the external environment. Furthermore the microreactor 22 is able to avoid any interference and contamination by the environment as well as by adjacent channels.

The manufacturing process is straightforward and employs steps that are common the manufacture of microreactors of this type; thus the resulting device is simple and cheap.

The separated channels described herein may be combined in an integrated device with any other components required for the application of interest. For example, the separated channels may be combined with one or more of the following: micropump, pretreatment channel, lysis chamber, detection chamber including detection means, capillary electrophoresis channel, and the like (see especially, Italian patent application TO2002A000808 filed on Sep. 17, 2002, publication nos. EP1400600, filed on Sep. 17, 2003 and US2004132059 filed on Sep. 16, 2003, in the name of the same applicant). The heaters may be integral, or may be provided by the platform into which the disposable microreactor wafer is inserted. The overall design of the complete device will be dictated by the application, and need not be detailed herein.

It is clear that numerous variations and modifications may be made to the process and to the microreactor described and illustrated herein, all falling within the scope of the invention, as defined in the attached claims.

The invention claimed is:

1. An integrated microreactor, comprising:

a) a first body including: i) a surface; ii) a buried channel; iii) a first hole and a second hole and a third hole, each of said first, second and third holes at a distance from each other and extending between said buried channel and said surface;

b) a second body including: i) a first opening and a second opening, at least a portion of said first opening being aligned with said first hole, and at least a portion of said second opening being aligned with said second hole; ii) a sealing layer arranged between said first body and said second body and separating said first hole from said first opening and said second hole from said second opening; and c) said third hole extending from said buried channel through said surface and said sealing layer, and wherein said second body closes and seals said third hole.

2. The integrated microreactor of claim 1, wherein said third hole is between said first hole and said second hole.

3. The integrated microreactor of claim 2, further comprising; a) a plurality of buried channels; b) a plurality of first holes and a plurality of second holes between said plurality of buried channels and said surface of said first body; c) said first opening facing said plurality of first holes, and said second opening facing said plurality of second holes, to make a plurality of separate buried channels having a common inlet and a common outlet.

4. The integrated microreactor of claim 1, further comprising a resilient plug inserted in said first opening.

5. The integrated microreactor of claim 3, further comprising: a) a plurality of buried channels; b) a plurality of first holes and a plurality of second holes between said plurality of buried channels and said surface of said first body; c) a plurality of first openings and a plurality of second openings in said second body; d) said plurality of first openings facing said plurality of first holes, and said plurality of second openings facing said plurality of second holes; and e) a plurality of resilient plugs in said plurality of first openings, to make a plurality of separate buried channels having separate inlets and outlets.

6. The integrated microreactor of claim 1, wherein said first body comprises semiconductor material and said second body comprises glass.

7. The integrated microreactor of claim 6, wherein said sealing layer comprises resist.

8. A process for manufacturing an integrated microreactor, comprising the steps of:

a) forming a first wafer having a surface; i) forming a buried channel in said first wafer; ii) forming a first hole and a second hole and a third hole between said buried channel and said surface, each of said first, second and third holes at a distance from each other;

b) forming a second wafer and forming a first opening and a second opening in said second wafer;

c) forming a sealing layer on either the first or second wafer and having a connection opening in said sealing layer;

d) arranging said sealing layer between said first wafer and said second wafer and aligning said first wafer and said second wafer so that at least a portion of said first opening is aligned with said first hole and at least a portion of said second opening is aligned with said second hole and aligning said connection opening with said third hole so that said second wafer closes and seals said third hole; and e) bonding said first wafer and said second wafer with said sealing layer and sealing said first hole and said second hole.

9. The process according to claim 8, wherein forming the sealing layer comprises: a) applying a bonding layer on either said first wafer and said second wafer; and b) forming a sandwich including said first wafer, said bonding layer and said second wafer; and c) treating said sandwich to obtain a multiple wafer.

10. The process according to claim 9, wherein applying a bonding layer comprises laminating a dry resist layer on either said first wafer and said second wafer.

11. The process of claim 9, wherein applying a bonding layer comprises applying said bonding layer onto said second wafer.

12. The process of claim 9, wherein applying a bonding layer comprises applying said bonding layer onto said first wafer.

13. The process of claim 9, wherein applying said bonding layer comprises laminating said bonding layer on said first wafer and lithographically defining said connection opening in said bonding layer.

14. The process of claim 9, wherein said first opening and said second opening extend through said second wafer and said bonding layer is applied after forming said first opening and said second opening.

15. The process of claim 9, wherein bonding is carried out at a temperature of 140-180° C.

16. The process according to claim 9, wherein bonding is carried out by applying a force to said sandwich.

17. The process of claim 9, wherein bonding said first wafer and said second wafer is carried out in vacuum conditions.

18. The process of claim 9, wherein bonding said first wafer and said second wafer is carried out at a pressure of $5\times10^{-7}$ to $5\times10^{-6}$ bar.

19. The process of claim 9, comprising: a) forming a plurality of buried channels in said first wafer; b) forming a plurality of first holes and a plurality of second holes between said plurality of buried channels and said surface; c) aligning said first opening to said plurality of first holes; d) aligning said second opening to said plurality of second holes, so as to create separate buried channels having a common inlet and a common outlet.

20. The process of claim 19, further comprising forming a resilient plug in said first opening.

21. The process of claim 9, further comprising: a) forming a plurality of buried channels in said first wafer; b) forming a plurality of first holes and a plurality of second holes between said plurality of buried channels and said surface; c) forming a plurality of first openings facing said plurality of first holes, and a plurality of second openings facing said plurality of second holes; and d) forming a plurality of resilient plugs in said plurality of first openings, so as to create separate channels having separate inlets and outlets.

22. A method of using of an integrated microreactor, a) the integrated microreactor comprising: i) a first body having a surface; a buried channel extending in said first body; a first and a second hole and a third hole extending between said buried channel and said surface, each of said first, second and third holes at a distance from each other; ii) a second body bonded to said first body; a first and a second opening in said second body, with at least a portion of said first opening being aligned with said first hole and at least a portion of said second opening being aligned with said second hole; and iii) a sealing layer having a connection opening and being arranged between said first and said second bodies and separating said first hole from said first opening and said second hole from said second opening and said connection opening is aligned with said third hole, and wherein said sealing layer is bonded to said first body and said second body at a low pressure, b) the method comprising: i) inserting a puncturing element in said first hole through said sealing layer, thereby perforating said sealing layer; and ii) introducing a fluid into said buried channel, wherein said low pressure draws said fluid into said buried channel.

23. The method of claim 22, wherein introducing a fluid is carried out by said puncturing element and including removing said puncturing element after introducing a fluid.

24. The method according to claim 23, including, before inserting a puncturing element, arranging a resilient plug into said first opening, wherein perforating said sealing layer includes perforating said resilient plug, wherein said resilient plug sealingly closes said first hole after removing said puncturing element.

25. A method of performing a biological test, wherein a biological fluid is applied to the integrated microreactor of any of claims 1, 2-6 and 7, and a biological test is performed.

26. The method of claim 25, wherein the biological test is amplification.

27. The method of claim 26, wherein the amplification is DNA amplification.

* * * * *

UNITED STATES PATENT AND TRADEMARK OFFICE

CERTIFICATE OF CORRECTION

PATENT NO. : 7,635,454 B2
APPLICATION NO. : 10/997235
DATED : December 22, 2009
INVENTOR(S) : Mastromatteo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1237 days.

Signed and Sealed this

Twenty-first Day of December, 2010

David J. Kappos

*Director of the United States Patent and Trademark Office*